(12) United States Patent
Muzila

(10) Patent No.: US 8,774,618 B1
(45) Date of Patent: Jul. 8, 2014

(54) ADJUSTABLE CAMERA FLASH MOUNTING DEVICE

(71) Applicant: Michael Muzila, Highland Hts, OH (US)

(72) Inventor: Michael Muzila, Highland Hts, OH (US)

( * ) Notice: Subject to any disclaimer, the term of this patent is extended or adjusted under 35 U.S.C. 154(b) by 0 days.

(21) Appl. No.: 14/046,276

(22) Filed: Oct. 4, 2013

(51) Int. Cl.
  *G03B 15/03* (2006.01)
  *G03B 17/56* (2006.01)
(52) U.S. Cl.
  CPC .................................. *G03B 17/566* (2013.01)
  USPC ......................................................... 396/198
(58) Field of Classification Search
  CPC ....... G03B 17/56; G03B 17/566; F16M 11/00
  USPC ................................................. 396/198, 428
  See application file for complete search history.

(56) References Cited

U.S. PATENT DOCUMENTS

| | | | |
|---|---|---|---|
| 2,922,609 A | 1/1960 | Collier | |
| 3,731,897 A | 5/1973 | Price | |
| 4,319,825 A | 3/1982 | Newton | |
| 5,737,657 A * | 4/1998 | Paddock et al. | 396/428 |
| 6,042,277 A * | 3/2000 | Errington | 396/419 |
| 6,354,544 B1 * | 3/2002 | Muzila | 248/187.1 |
| 6,773,172 B1 * | 8/2004 | Johnson et al. | 396/428 |
| 6,779,932 B2 * | 8/2004 | DeSorbo et al. | 396/419 |
| 7,457,535 B2 * | 11/2008 | Johnson | 396/155 |
| 8,345,154 B2 * | 1/2013 | Zhan | 348/375 |
| 8,348,214 B2 * | 1/2013 | Vogt | 248/316.4 |
| 2011/0076095 A1 * | 3/2011 | Storch et al. | 403/322.4 |
| 2013/0256484 A1 * | 10/2013 | Kessler et al. | 248/224.7 |

* cited by examiner

*Primary Examiner* — Rodney Fuller
(74) *Attorney, Agent, or Firm* — Harpman & Harpman

(57) ABSTRACT

An adjustable camera flash mounting bracket device for rapid camera flash repositioning in relation to a camera attachment platform in selective orientation. The camera flash mounting bracket device includes a camera receiving base with a curved spaced upstanding camera flash mounting platform assembly having a complimentary curved flash engagement configuration. Multiple rotatable guide members are secured within the curved flash engagement portion and are received within complimentary grooves in the flash mounting base. Retainment force applied by spring urged guide members permits for selective rotation within the curved flash mounting base to be grippingly retained therewithin at user select position orientation in relation to the fixed camera mount.

7 Claims, 7 Drawing Sheets

ADJUSTABLE CAMERA FLASH MOUNTING DEVICE

BACKGROUND OF THE INVENTION

1. Technical Field

The present invention relates to adjustable camera flash mounts that provide for camera flash positioning adjustments in relation to the orientation of the camera on multiple planes.

2. Description of Prior Art

Both amateur and professional photographers have occasion to rotate their cameras from a horizontal position to a vertical position or any position therebetween to obtain a desired photograph of the subject matter. While this typically creates no physical problems for the photographer, such camera rotation usually results in the rotation of the associated flash unit that is either physically attached to the camera or to a bracket that is attached to the camera. When the angular orientation of the flash unit is changed, side shadows, which are undesirable, may be introduced into the resulting photograph. It should be noted that shadows behind the subject are desirable and such shadows can be produced when the flash unit is above the subject rather than to one side thereof. There are numerous devices or brackets available to hold a flash in a specific orientation while changing the orientation of the camera. Examples of related prior art address this problem by maintaining the orientation of the flash in relation to a movable mount for the camera, see for example U.S. Pat. No. 3,731,897 which discloses a support for a camera wherein the angular position of the camera with respect to the support can be adjusted by means of a mounting screw which is received through an elongated slot within the support and which threadably engages the mount in the base of the camera. In this reference, in order to change the angular position of the camera with respect to the supporting flash unit attached thereto, the mounting screw must be loosened and the camera must be moved relative to the support and the mounting screw re-tightened.

U.S. Pat. No. 4,319,825 discloses a support for a camera and flash unit that permits the camera to rotate through ninety degrees while maintaining the flash unit in fixed position above the subject.

U.S. Pat. No. 2,922,609 discloses an adjustable camera mount that utilizes a support member having a lower cylindrical surface that is received within a complimentary circular depression provided within a disk attached to the base plate.

Applicant's own U.S. Pat. No. 6,354,544 is directed to an adjustable camera mounting device wherein the camera is rotated on a movable mounting arm allowing the camera to be repositioned in relation to a camera flash attached to the base portion of the mounting device.

It can therefore be seen that a number of mounting devices and brackets have been developed to provide for the camera to be rotatably adjusted without changing the orientation of the flash unit in regards to the subject matter. It therefore has become desirable to develop a camera flash mounting device which will allow the flash unit to move independently while the camera remains in a stated position orientation thereby achieving a greater flexibility and usability for the user non-dependent on desired camera orientation for flash positioning.

SUMMARY OF THE INVENTION

An adjustable camera flash mounting bracket device that provides for an integrated repositioning of a mounted camera flash in regards to a fixed mounted camera. The orientation of the independently adjustable camera flash vis-à-vis the camera is achieved by a movable flash mounting base having a curved interconnected armature with an internal guide and resistant inducing guide elements affording incremental and pre-determined fixed interengagement fixation points therebetween. The combination of the guide and pressure gripping contact between the rotatable guide surfaces and the guide channels within the flash mount assures slidable gripping contact and therefore positioning therebetween without changing the relative orientation of the camera so positioned within the bracket structure by encompassing a moving orientation of the flash mount to maintain the flash at a desired position to the subject matter.

DETAILED DESCRIPTION OF THE INVENTION

Figure 1:
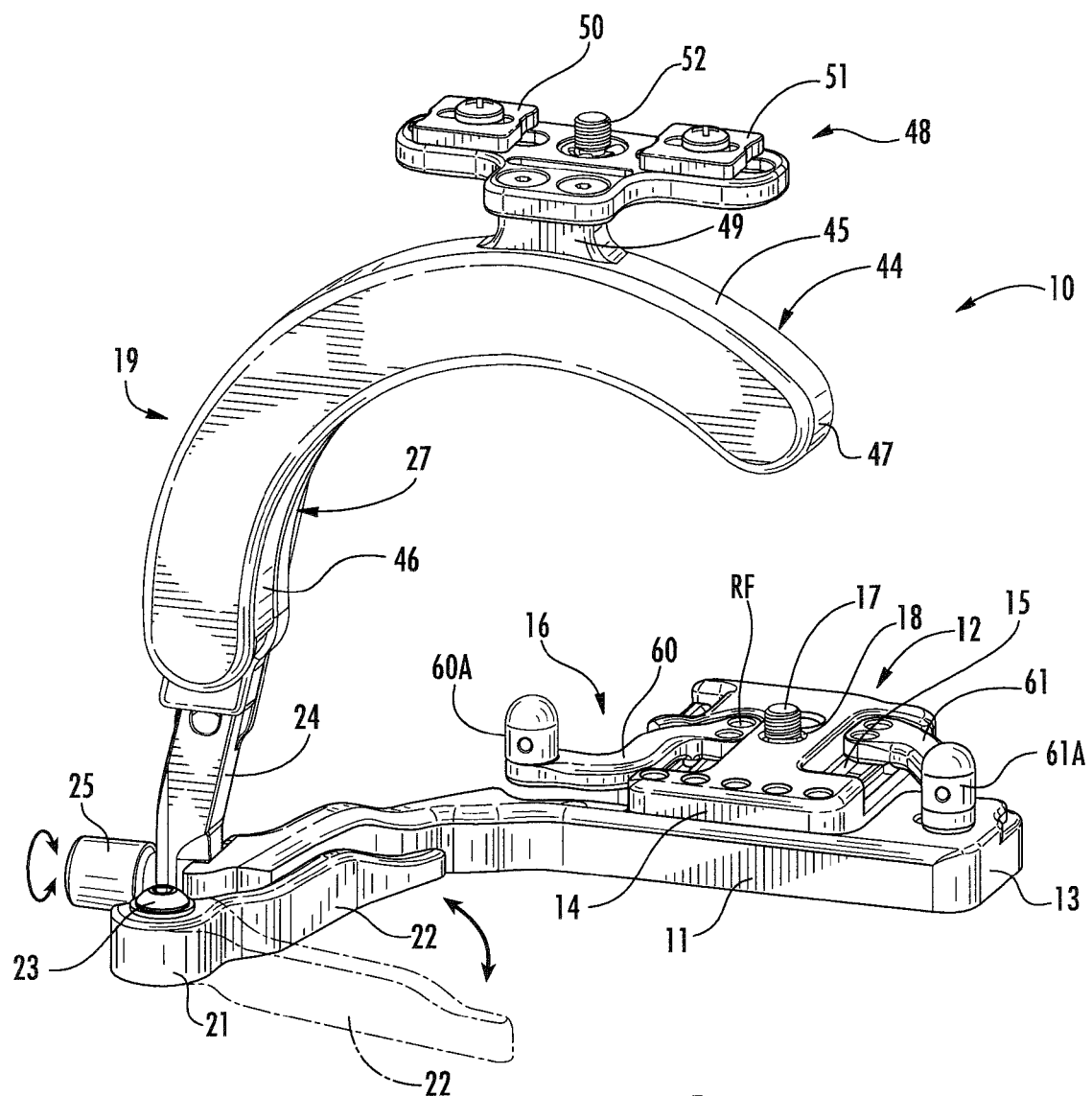
FIG. 1 is a perspective view of the adjustable camera flash mounting device of the invention illustrating the orientation between the movable flash mount and a fixed camera, not shown, positioned thereon.

Referring now to FIGS. 1, 2, 7 and 8 of the drawings, an adjustable camera flash mounting device 10 of the invention can be seen having a base member 11 with a camera mounting assembly 12 secured inwardly from one end thereof. The camera mounting assembly 12 has an apertured support base 14 with multiple engagement slots 15 extending therethrough for adjustably receiving camera positioning arm elements 16. A central threaded camera attachment fitting 17 extends freely and rotatably through a central bore 18 in the platform 14 to selectively engage and secure a camera, not shown, thereto as will be understood by those skilled in the art and as will be described in greater detail hereinafter.

A camera flash mounting assembly 19 of the invention is mounted on and extends from the base member 11 inwardly of its oppositely disposed free end 21. An adjustable base stabilization arm 22 is pivotally secured by a threaded pivot pin 23 to the base and can therefore be selectively extended as shown in broken lines in FIG. 1 of the drawings providing an independent self-support to the base 11.

Figure 7:
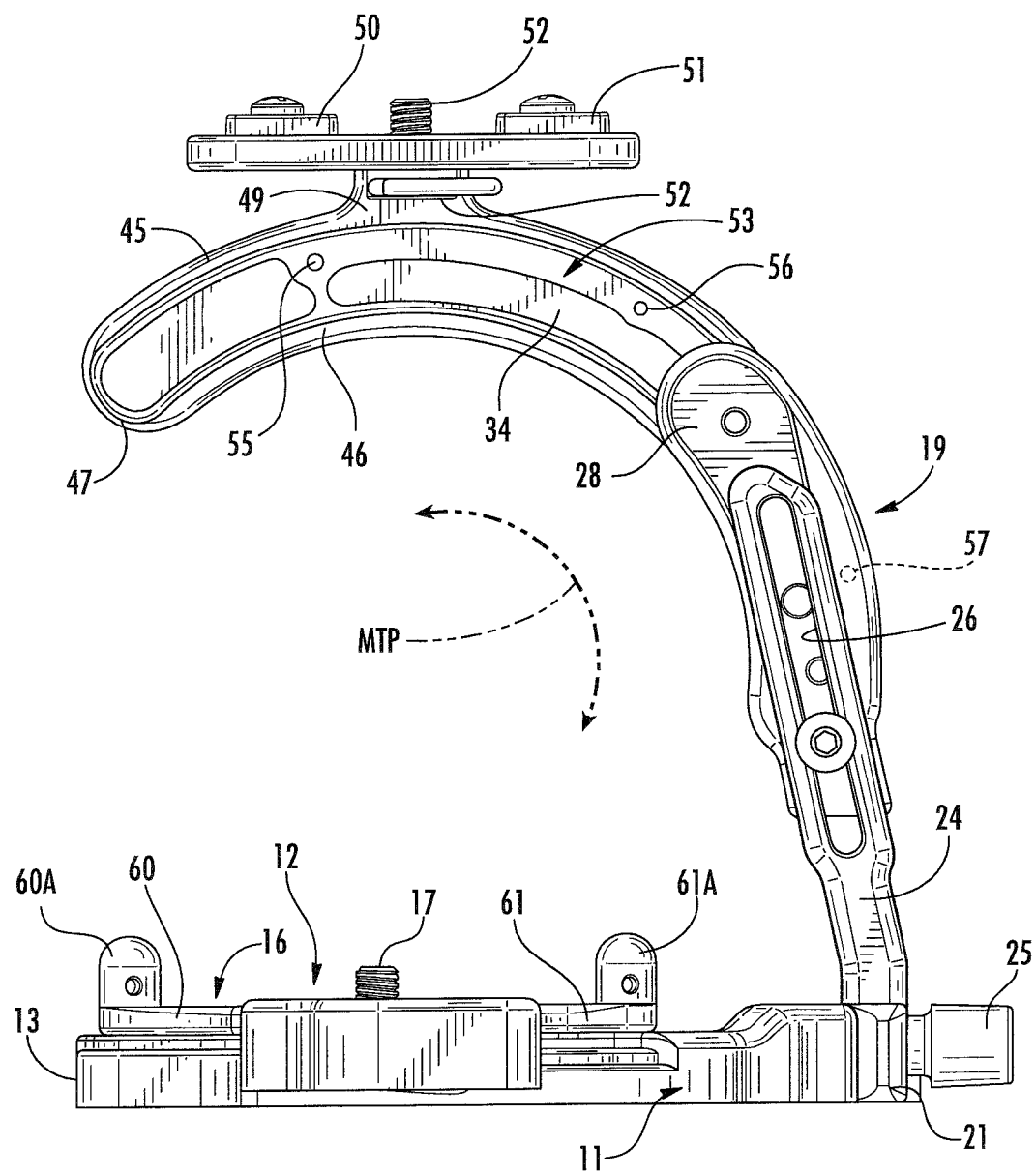
FIG. 7 is a rear elevational view of the adjustable camera flash mounting device.

The camera flash mounting assembly 19 has a main upstanding support bracket 24 removably secured by a threaded finger engagement fitting 25 to the base member 11, best seen in FIG. 7 of the drawings. The support bracket 24 is slotted longitudinally at 26 for adjustably securing in fixed position a guide wheel assembly 27 having a curved internal base 28.

Figure 5:
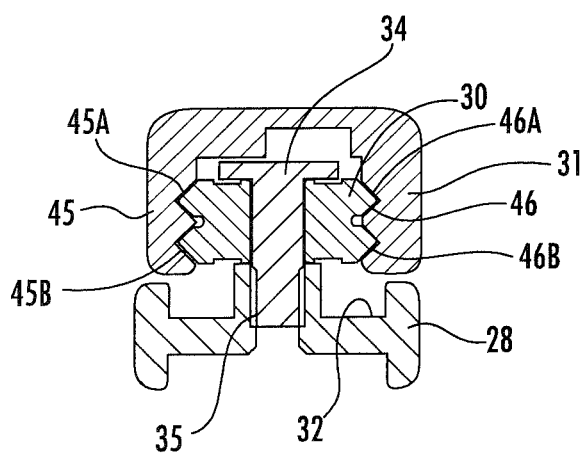
FIG. 5 is a cross-sectional view on lines 5-5 of FIG. 2.

The guide wheel assembly 27 has a pair of arcuately spaced guide wheels 29 and 30, each having an annular beveled engagement surface 31 which are rotatably mounted to the base 28 within associated recesses 32 and 33 by respective bolts 34 extending through a central aperture therein and received with a threaded bore 35 as best seen in FIG. 5 of the drawings.

Figure 2:
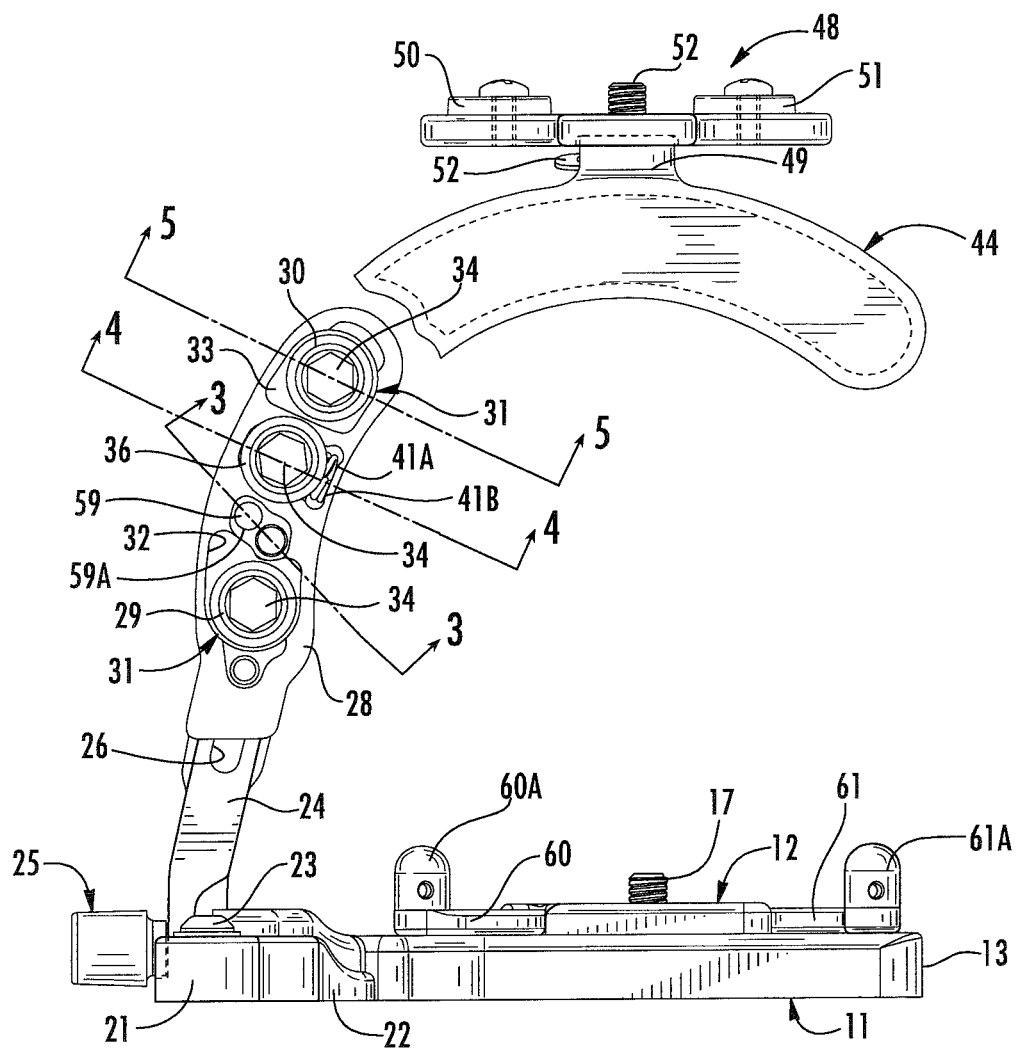
FIG. 2 is a front elevational view thereof with portions broken away and in broken lines illustrating the interengagement guides and the adjustable flash mounting portion shown in broken lines.

A pressure guide member 36 is positioned in a recess 37 in the base 28 between the hereinbefore described guide wheels 29 and 30. The pressure guide member 36 has a spring urged guide wheel 38 which is rotatably secured to a movable mounting block 39 by a bolt 34. The mounting block 39, best seen in FIG. 4 of the drawings, has a spring receiving seat 40 therein for tension springs 41A and 41B used in this example. The tension springs 41A and 41B are in contact with the inner wall of the recess 37 so as to urge the mounting block 39 and its rotatable guide wheel 38 towards an inner curved groove engagement surface 43 of a movable curved flash mounting arm 44 when slidably positioned thereover as seen in FIG. 2 of the drawings.

The camera flash mounting arm 44 is typically made from a metallic material, such as aluminum as is the hereinbefore described base member 11, main support bracket 24 and guide wheel assembly curved base 28.

Figure 4:
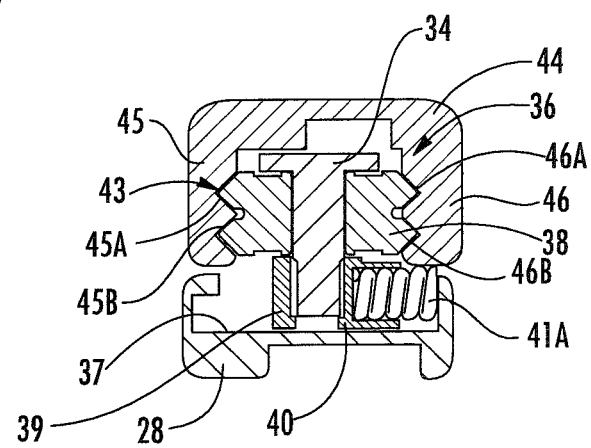
FIG. 4 is a cross-sectional view on lines 4-4 of FIG. 2.

The flash mounting arm 44 circumscribes an arc with a pair of spaced arcuate sidewalls 45 and 46 having pairs of side by side grooves 45A, 45B and 46A and 46B formed respectively therein as seen in FIGS. 4 and 5 of the drawings. The grooved surfaces permit the guide wheels 29 and 30 and pressure guide wheel 38 to be received within there defined beveled exterior wheel surfaces for arrangement therebetween and allowing the flash mounting arm 44 to be rotatably positioned on the fixed guide wheel assembly 27. The sidewalls 45 and 46 are interconnected by an integral end wall forming a closed end at 47.

The flash mounting arm 44 has a T-shaped camera flash mounting bracket 48 secured thereto by a lug 49 extending integrally from the sidewall 45 in spaced relation to the closed end 47. The camera flash mounting bracket 48 has adjustable spacer blocks 50 and 51 with a threaded finger engagement bolt 52 extending centrally therethrough to provide a universal camera flash engagement and retainment arrangement as will be well understood by those skilled in the art.

Referring to FIGS. 1-6 and 7 of the drawings, as engaged, the camera flash mounting arm 44 is positioned on and over the fixed guide wheel assembly 27 such that the guide wheels 29 and 30 and intermediate pressure guide member 36, spring urged guide wheel 37 are received between the opposing grooved pairs 45A and 45B and 46A and 46B as described in the curved flash mounting arm 44 and the spring urged guide wheel 38 grippingly contacts the corresponding portions of the registered grooves 45A and 45B imparting gripping contact to the respective surfaces thereby providing a resistant sliding contact therebetween.

Figure 6:
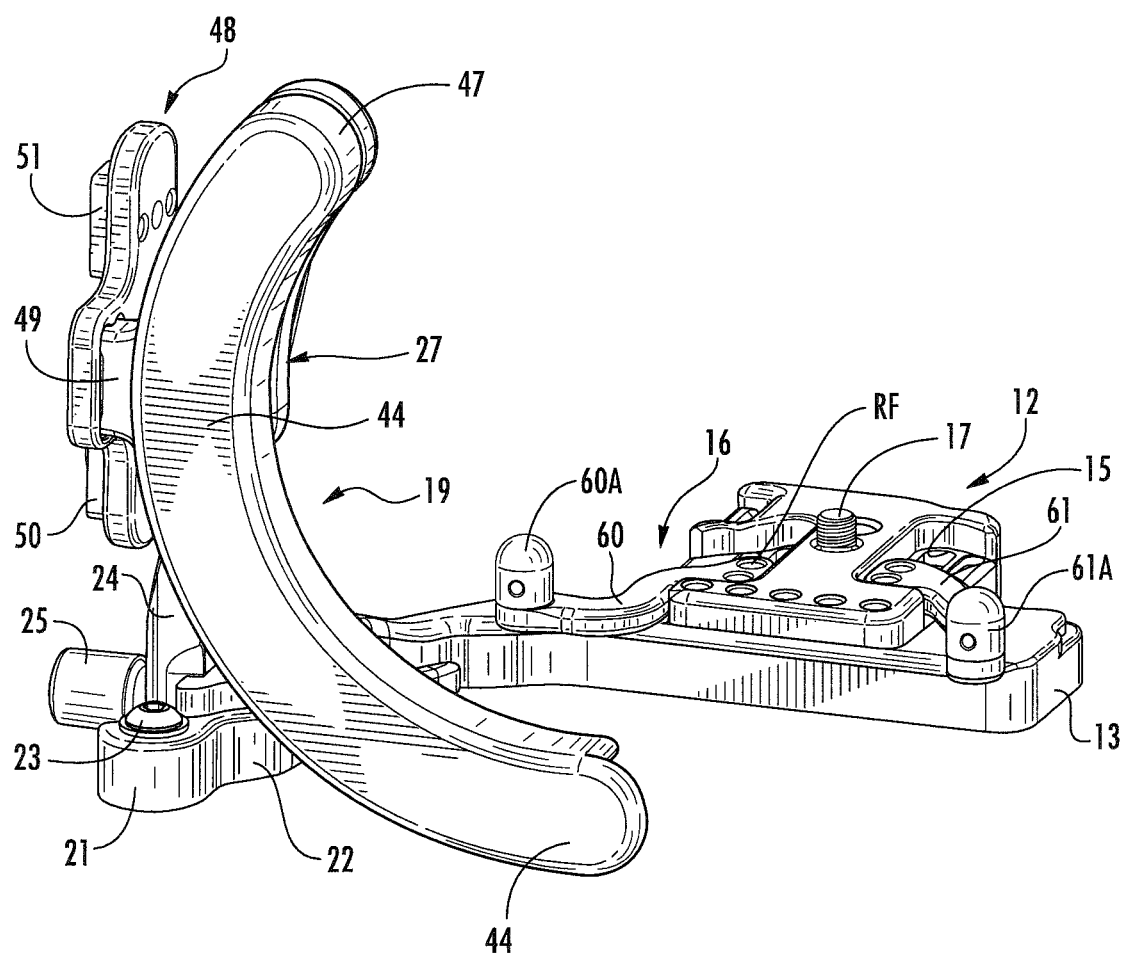
FIG. 6 is a perspective view of the adjustable camera flash mounting device of the invention with rotatably adjustable flash mount in maximum rotational orientation.

This arrangement allows the mounting arm 44 and attached camera flash mount 48 to be rotated therealong and once a desired rotational position has been achieved to be held in that selected position even if that position is such that the camera flash mount 19 is oriented ninety degrees with respect to the camera mount 12 as shown in FIG. 6 of the drawings.

It will be seen that an inner surface 53 of the flash mounting arm 44 between the aforementioned grooved sidewalls 45 and 46 has a curvilinear recessed area 54 therein with a plurality of adjacently positioned spaced detents 55, 56 and 57. The recessed area 54 extends between respective defined points of the closed end 47 and open end of the flash mounting arm 44.

Figure 3:
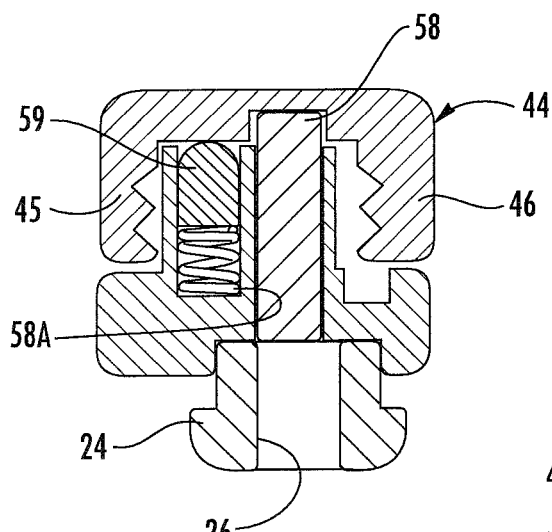
FIG. 3 is a cross-sectional view on lines 3-3 of FIG. 2.

Referring to FIG. 3 of the drawings, a travel stop pin 58 extending from a registration aperture 58A in the guide wheel assembly 27 and is in registering contact within the recessed area 54 and therefore defines a maximum travel path MTP of the flash mounting arm 44 as illustrated FIG. 1 and FIG. 6 of the drawings.

It will be correspondingly seen, therefore, that the hereinbefore described detents 55, 56 and 57 can be selectively engaged by a spring mounted indexing pin 59 extending resiliently from a registration aperture 59A in the base 28.

The combination of the multiple arm retaining elements with the hereinbefore described guide wheel assembly 27 will allow the flash mounting arm 44 to be rotatable with respect to the camera mounting base member 12 within a given range and then grippingly held at any position selected within its travel path as previously noted.

Figure 8:
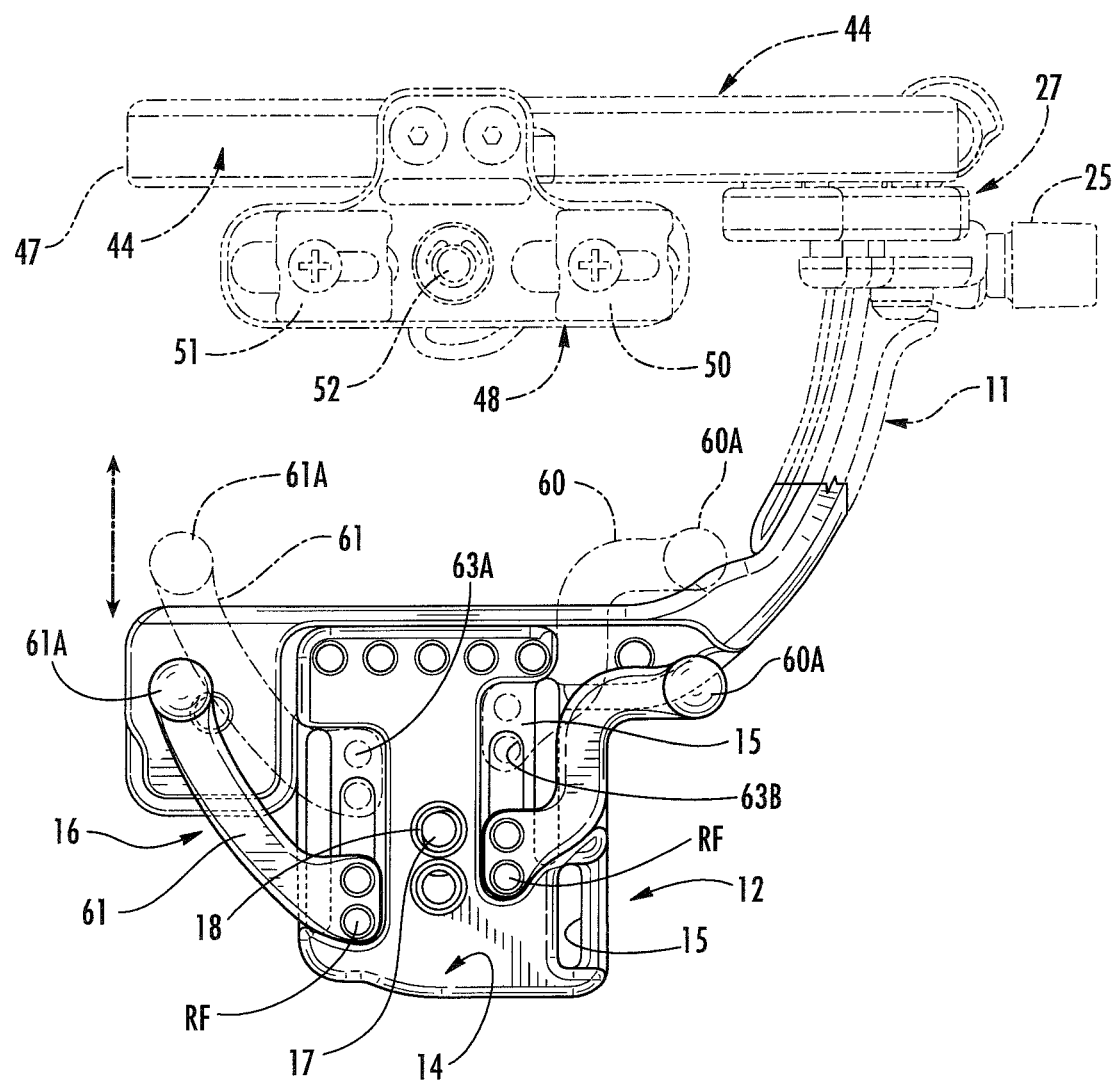
FIG. 8 is an enlarged top plan view of the camera mounting platform on the camera flash mounting device.
Figure 9:
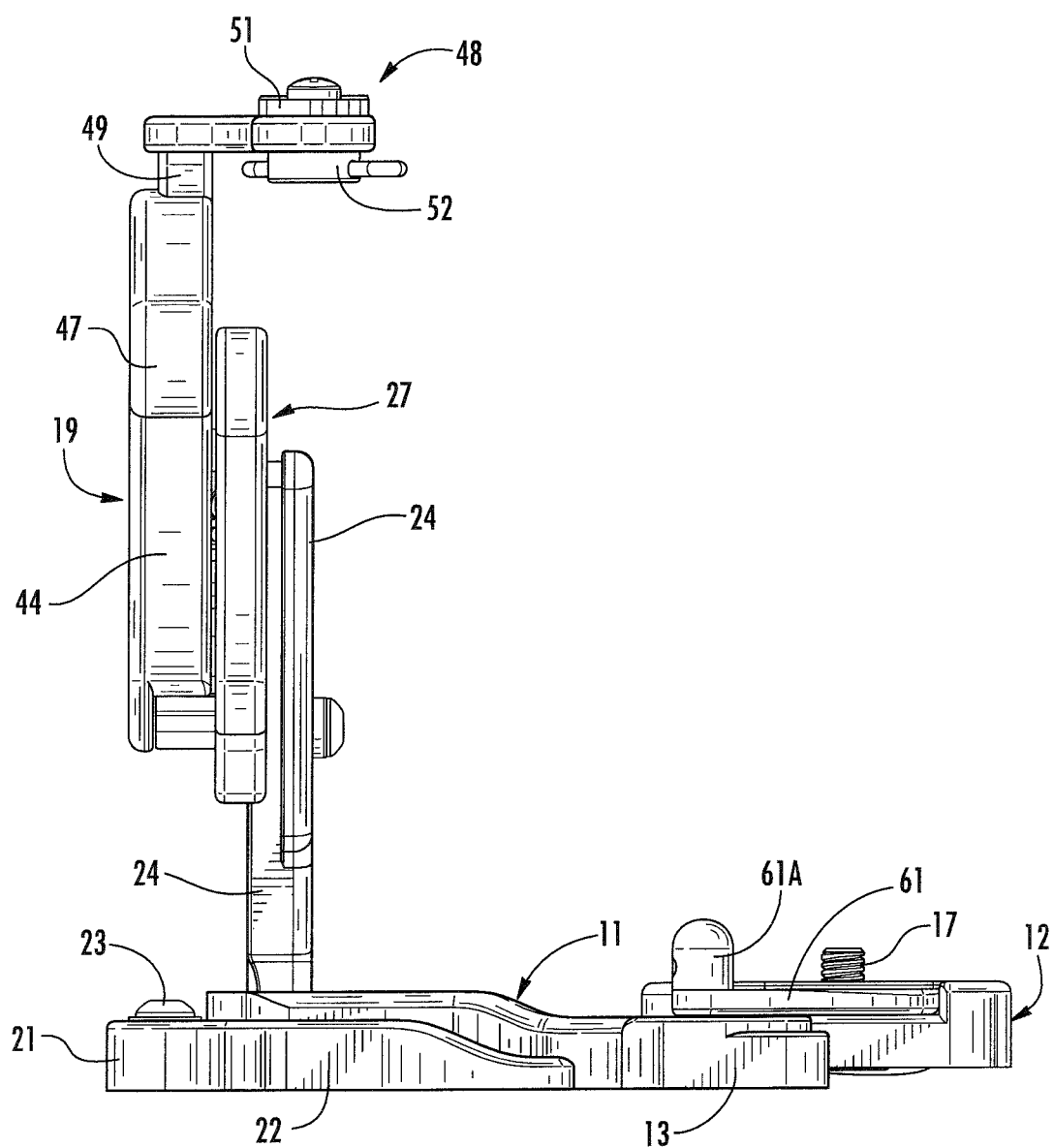
FIG. 9 is an end elevational view of the adjustable camera flash mounting device of the invention.

Referring to FIGS. 1 and 8 of the drawings, the camera mounting assembly 12 having the camera positioning elements 16 are comprised of a pair of contoured armatures 60 and 61, each having an upstanding camera engagement registration stop 60A and 61A at the respective free ends. Each of the armatures 60 and 61 are adjustably positioned, as seen in broken lines in FIG. 8 of the drawings, within their respective registration slots 15 by a retainment fasteners RF extending through selected threaded apertures therein 63A and 63B. The respective contoured armatures 60 and 61 can therefore be selectively adjusted to accommodate different camera body configurations, not shown, by repositioning about a retainment attachment and pivot point within the respective slots 15 indicated by directional broken arrows.

It will thus be seen that the camera flash mounting device 10 of the invention permits infinite rotational adjustment of the camera flash, not shown, along its curvilinear travel path from a parallel horizontal plane to the camera mounting assembly 12 to a ninety degree vertical orientation thereto as seen in FIG. 6 of the drawings. Additionally, after the camera flash arm 44 has been adjusted into the desired position, it is grippingly retained, as noted, automatically.

This allows, in use, the maintaining of a relative and optimal position of a mounted camera flash, not shown, relative to the photographic subject, not shown, regardless of the actual rotation of the camera imparted by the user. This assures shadow management by during a photo shoot as will be understood by those skilled in the art.

It will therefore be evident that various changes and modifications may be made therein without departing from the spirit of the invention.

Therefore I claim:

1. An adjustable rotatable camera flash mounting device comprising,
    a base member having a fixed camera mounting assembly and a movable camera flash mounting assembly extending therefrom,
    said camera flash mounting assembly comprises,
    an upstanding support bracket, a curved pressure guide wheel assembly adjustably secured thereto, said guide wheel assembly having a spring biased guide wheel rotatably secured to a spring urged movable mounting block within said guide wheel assembly independent of said upstanding support bracket and base member, a camera flash platform extending from a curved flash mounting arm having a correspondingly curved recess therein with spaced parallel grooved sidewalls substantially conforming to said curved configuration of said pressure guide wheel assembly receivable therein so as to grippingly engage said grooved sidewalls.

2. The adjustable rotatable camera flash mounting device set forth in claim 1 wherein said spring biased guide wheel and said fixed guide wheels are in arcuate longitudinal alignment to one another within a curved base of said guide wheel assembly.

3. The adjustable rotatable camera flash mounting device set forth in claim 1 wherein said fixed rotatable guide wheels and said spring biased rotatable guide wheel are registerably received between said respective grooved sidewalls in said flash mounting arm.

4. The adjustable rotatable camera flash mounting device set forth in claim 1 wherein said spring biased rotatable guide wheel is in biased registration with one of said grooved sidewalls in said flash mounting arm.

5. The adjustable rotatable camera flash mounting device set forth in claim 1 further including, a plurality of longitudinally spaced detents in said flash mounting arm curved recess in spaced relation to said respective grooved side walls and a spring urged pin in said pressure guide wheel assembly aligned for select sequential registration in said detents so that said camera flash platform is oriented in a specific position relative to said base member.

6. The adjustable rotatable camera flash mounting device set forth in claim 1 further comprises including a curvilinear recess channel in said flash mounting arm and a stop pin extending from said pressure guide wheel assembly registerable therewithin.

7. The adjustable rotatable camera flash mounting device set forth in claim 1 wherein said fixed camera mounting assembly comprises, an apertured support base, a threaded camera engagement fitting extending through a central bore in said support base and a plurality of elongated mounting slots, a pair of camera positioning arm elements adjustably secured respectively in said mounting slots and wherein said camera positioning arms are contoured having upstanding cylindrical ends thereon.

* * * * *